Oct. 27, 1959　　　　E. LJUNGDAHL　　　　2,910,690
RESPONDING RADARSTATION
Filed May 3, 1956
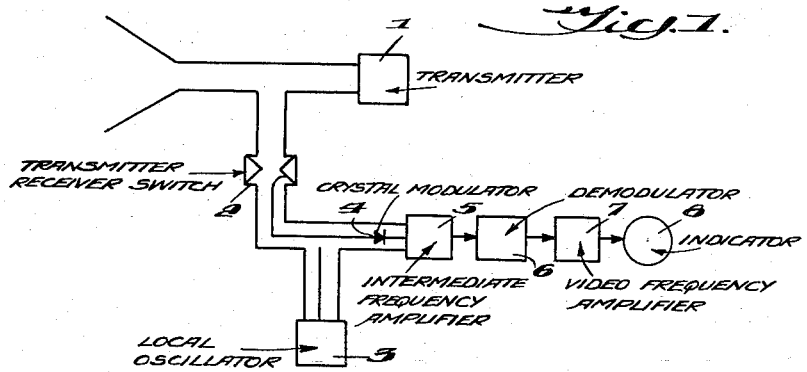
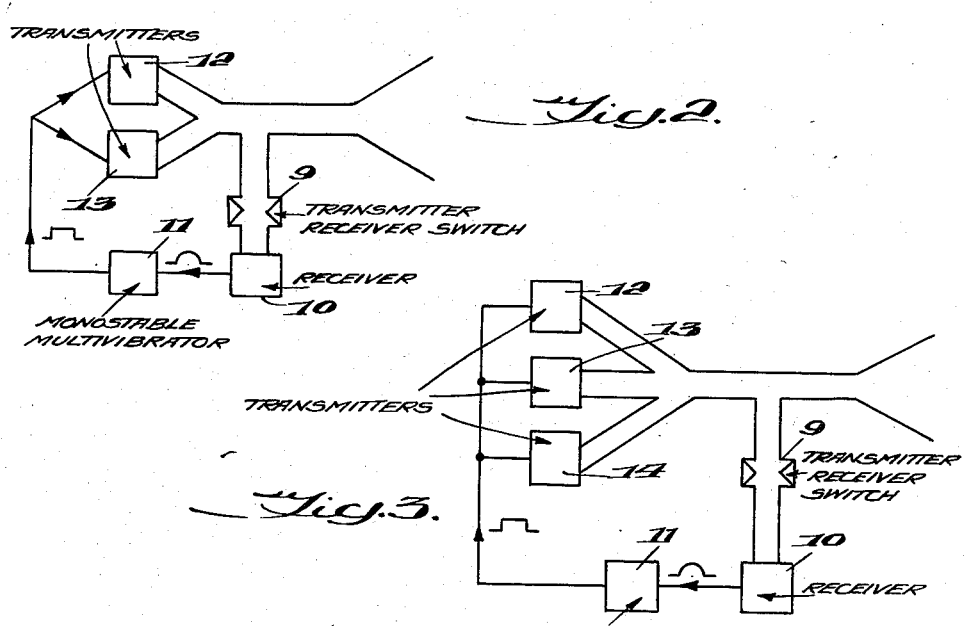
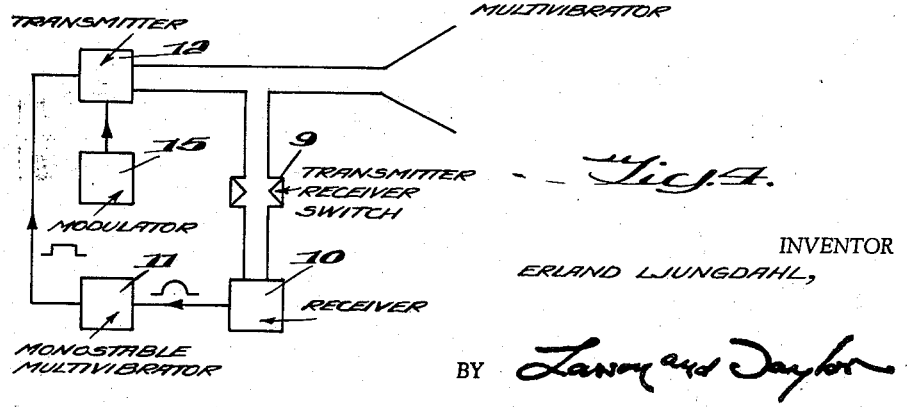
INVENTOR
ERLAND LJUNGDAHL,
BY *Laney and Taylor*
ATTORNEYS

United States Patent Office 2,910,690
Patented Oct. 27, 1959

2,910,690
RESPONDING RADARSTATION

Erland Ljungdahl, Djursholm, Sweden, assignor to Svenska Aktiebolaget Gasaccumulator, Lidingo, Sweden, a corporation of Sweden Application May 3, 1956, Serial No. 582,482

Claims priority, application Sweden May 12, 1955

2 Claims. (Cl. 343—6.5)

A problem, which often occurs in responding radar stations, i.e. so called radio beacons, is to produce a responding signal which can be received by interrogating radar stations with mutually slightly differing frequencies. This problem has usually been overcome in such a way that the receiver and the transmitter of the responding radar station have been given a periodically varying frequency, whereby the responding radar station has successively responded to incoming interrogating signals with mutually slightly differing frequencies.

In the responding radar station according to the present invention this problem is solved in a constructively more simple manner. The responding radar station according to this invention is characterized in that upon an interrogating signal from the interrogating station transmitter it is arranged to transmit two or more simultaneous responding pulses within the wavelength band of the interrogating station, at least two of said responding pulses being separated in frequency by an amount equal to the intermediate frequency of the interrogating station receiver.

The invention is best illustrated with reference to the attached drawing wherein:

Figure 1 diagrammatically illustrates an interrogating station according to a preferred embodiment of the invention;

Figure 2 illustrates diagrammatically a responding radar station according to this preferred embodiment;

And Figures 3 and 4 diagrammatically illustrate modifications of the responding radar station according to the invention.

The interrogating station according to Figure 1 is provided with a transmitter 1, a transmitter-receiver-switch 2 and a receiver, which comprises a local oscillator 3, a crystal modulator 4, an intermediate frequency amplifier 5, a demodulator 6, a video frequency amplifier 7 and an indicator 8.

The responding radar station according to Figure 2 is provided with a transmitter-receiver-switch 9, a receiver 10 with amplifier and demodulator, the output circuit of which is connected to the input circuit of a monostable multivibrator 11, the rectangular output pulses of which modulate two transmitters 12 and 13, which lie within the wavelength band of the interrogating station receiver and transmit simultaneous pulses. These pulses differ in frequency with an amount which equals the intermediate frequency of the interrogating station receiver. Accordingly, two simultaneous responding pulses reach the interrogating station receiver and they give directly after the modulation in the crystal modulator a signal of the intermediate frequency. The oscillators of the transmitters 12 and 13 consist preferably of magnetrons and the constant difference in frequency between them can be maintained if one of the magnetrons is provided with a tuning member, which is so controlled by the frequency difference that it is kept constant.

If the local oscillator 3 is switched off, no usual echoes and conventional responding radar stations are indicated on the indicator but only responding stations made in accordance with the invention.

For identifying purposes the responding radar station can of course in known ways be arranged to transmit several successive responding pulses upon an interrogation.

The invention is of course not restricted to the embodiment above described but can be modified in several ways within the scope of the invention. The responding radar station may thus be provided with three (or more) transmitters which transmit simultaneous pulses. The frequency differences between them is chosen so as to correspond to the various intermediate frequencies of interrogating radar stations, for instance 30 and 100 mc./sec. According to Figure 3 the responding radar station is provided with three transmitters 12, 13, and 14, which transmit simultaneous pulses. These transmitters are controlled by the receiver 10 over the multivibrator 11. It is also possible to provide in the responding radar station for only one transmitter, the carrier wave of which is modulated with two side bands which differ in frequency from the carrier wave with an amount which equals the intermediate frequency of the interrogating radar station. Therefore, in the modification according to Figure 4 only one transmitter 12 is used and this transmitter is adapted to transmit both the carrier frequency and two side bands which differ in frequency from the carrier frequency by an amount which equals the intermediate frequency of the interrogating radar station. The side bands are obtained by means of a modulator 15 which is connected to the transmitter 12.

What I claim is:
1. A radar station for responding to signals from an interrogating station, comprising a receiver for receiving interrogating signals from the interrogating station and transmitting means for transmitting responding signals to said interrogating station, said transmitting means including means for transmitting at least two simultaneous pulses separated in frequency by an amount which equals the intermediate frequency of a receiver of the interrogating station.

2. A radar station according to claim 1 wherein the transmitting means comprises at least two transmitters, said transmitters being controlled by said receiver to transmit pulses on mutually different frequencies.

References Cited in the file of this patent

UNITED STATES PATENTS

| | | |
|---|---|---|
| 1,802,760 | Gage | Apr. 28, 1931 |
| 2,193,102 | Koch | Mar. 12, 1940 |
| 2,543,454 | Gaerttner | Feb. 27, 1951 |
| 2,658,195 | McConnell | Nov. 3, 1953 |
| 2,678,999 | Norris | May 18, 1954 |

FOREIGN PATENTS

| | | |
|---|---|---|
| 449,322 | Great Britain | June 19, 1936 |